United States Patent Office 3,444,169
Patented May 13, 1969

3,444,169
PROCESS FOR 11 - AMINODIBENZ[b,f][1,4]OX-
AZEPINES AND ANALOGOUS THIAZEPINES
Charles Frederick Howell, Upper Saddle River, and
Robert Allis Hardy, Jr., Ridgewood, N.J., and
Nicanor Quinones Quinones, New York, N.Y., as-
signors to American Cyanamid Company, Stam-
ford, Conn., a corporation of Maine
No Drawing. Filed Jan. 17, 1966, Ser. No. 520,865
Int. Cl. C07d 87/54, 93/40
U.S. Cl. 260—268                                  7 Claims

ABSTRACT OF THE DISCLOSURE

The preparation of substituted 11-aminodibenz[b,f][1,4]oxazepines or thiazepines by reacting the corresponding 11-amino, lower alkylamino or dilower alkylamino oxazepine or thiazepine with a primary or secondary amine, is described. The compounds prepared by the process are useful as tranquilizers or for their anti-depressant properties.

---

This invention relates to a novel process for preparing azepines. More particularly, it relates to a method of preparing substituted 11-aminodibenz[b,f][1,4]oxazepines or thiazepines.

The azepines prepared by the process of this invention may be represented by the following formula:

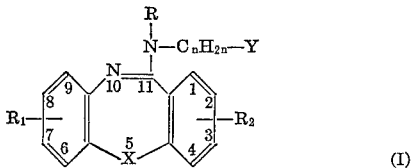

(I)

wherein R is hydrogen or lower alkyl; $R_1$ and $R_2$ are hydrogen, lower alkyl, lower alkoxy, halogen or trifluoromethyl; X is oxygen or sulfur, Y is hydroxy, amino, lower alkylamino, lower dialkylamino, lower alkoxy, 1-piperazino, 4-(lower alkyl)-1-piperazino, 4-(hydroxy-loweralkyl)-1-piperazino, pyrrolidino, lower alkylpyrrolidino, piperidino, lower alkylpiperidino, morpholino, lower alkylmorpholino and the

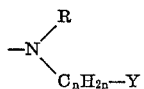

group taken together represents a piperazino selected from the group consisting of 1-piperazino, 4-(lower alkyl)-1-piperazino and 4-(hydroxylower alkyl)-1-piperazino and $n$ is an integer from 2 to 4.

The compounds prepared by the process of the present invention are physiologically active on the central nervous system. They show high activity as tranquilizers at non-toxic doses, and in some instances anti-depressant properties at dosage levels which produce neither overt stimulation nor depression.

A useful test for tranquilizer activity consists of measuring the reduction of spontaneous motor activity in animals by means of an actophotometer (a photoelectric device for quantitatively measuring locomotor activity). Graded doses of the active compounds prepared by the process of this invention are administered to groups of mice, and the effective dosage range for a significant reduction of motor activity (a measure of tranquilization) compared to control groups is established. The use of reduced motor activity as a measure of tranquilizing activity has been described by W. D. Gray, A. C. Osterberg and C. E. Rauh, Archives Internationales et de Therapie, vol. 134, p. 198 (1961), and by W. J. Kinnard and C. J. Carr, Journal of Pharmacology and Experimental Therapeutics, vol. 121, p. 354 (1957).

The anti-depressant properties of the compounds prepared by the process of the present invention are evident by measuring their ability to counteract a depression induced in animals by the administration of tetrabenazine hexamate. Graded doses of the active compounds of this invention are administered to groups of mice, and this is followed by administering a dose of tetrabenazine which is known to markedly depress the exploratory behavior of normal mice. The anti-depressant treated groups show normal exploratory behavior, while the control groups, and groups treated with an ineffective anti-depressant agent, do not show this normal exploratory behavior, but show the well known profound depression induced by tetrabenazine. The results from several dose levels are used to establish effective dose ranges. The anti-depressant compounds prepared by the process of this invention show their desirable properties by this procedure at dose levels which produce little or no untoward reactions such as ataxia or reduced spontaneous motor activity.

In addition, some of the compounds prepared by the process of this invention show other valuable pharmaceutical properties such as analgesic activity.

The compounds of this invention are, in general, white crystalline solids only slightly soluble in water, but moderately soluble in organic solvents such as methanol, ethanol and the like. They are basic substances which are usually soluble in aqueous mineral acids at room temperature. They form substantially insoluble acid addition salts such as the hydrochloride, sulfate, phosphate, citrate, tartrate, maleate, fumarate, etc. The present compounds, generally in the form of their salts, may be administered orally or parenterally and when so administered are effective central nervous system agents. For oral administration the new compounds of this invention may be incorporated with the usual pharmaceutical excipients and used, for instance, in the form of tablets, capsules, dragees, liquids to be administered in drops, emulsions, suspensions and syrups, and in chocolate, candy, chewing gum and the like. They may also be administered in suppositories, and in aqueous solutions for parenteral injection.

The new process of this invention consists of transamination of an 11-aminodibenzo[b,f][1,4]oxazepine or thiazepine (II) with a diamine reagent (III) as illustrated by the following reaction scheme:

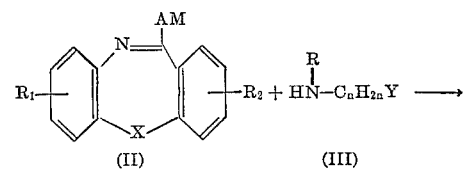

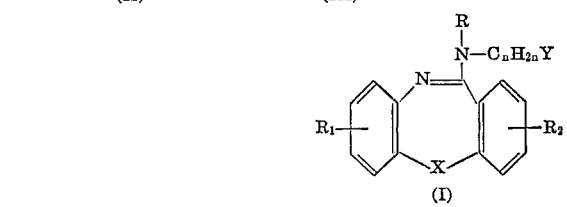

wherein R, $R_1$, $R_2$, X, Y and $n$ are as described hereinbefore and AM is selected from the group consisting of amino, lower alkylamino and dilower alkylamino.

The reaction is generally carried out in the presence of an excess of the diamine reagent (III) in order to insure an effective transamination in a reasonable period of time. This reaction is catalyzed by addition salts of the 11-aminodibenz[b,f][1,4]oxazepine or thiazepine reactants which are generally employed in the proportions from about 0.1 to about 1.1 molecular equivalents. These salts may be prepared independently for use in the transamination reaction, or may be produced in situ during the reaction process. Suitable addition salts are those formed with acids such as hydrochloric, sulfuric, phosphoric and the like. Mineral acid salts of the diamine reagents (III), in limited amounts, are also useful catalysts in that they may be expected to produce salts of the 11-aminodibenz[b,f][1,4]oxazepine reactants (II) by an exchange process, and thereby facilitate the transamination process. Ammonium halides such as ammonium chloride and the like are also effective catalysts for the desired transaminations for the same reasons. These transamination reactions are generally carried out at temperatures of between about 80° C. and 220° C. with the preferred temperature being from about 125° C. to 175° C. These reactions are frequently carried out at the refluxing temperature of the diamine reagent (III), which also acts as the solvent. The addition of other solvents which are inert under the reaction conditions may also be useful, such as lower alkanols and lower alkanol ethers, for example, ethanol, butanol, diethyleneglycol monoethyl ether, and the like. When effective transamination has been achieved, usually after heating from about 2 to about 48 hours, the desired products (I) are generally obtained by evaporation of the solvent and/or excess diamine reagent (III), followed by purification of the crude product residue by methods well known to those skilled in the art.

Among the azepines which may be useful as starting materials in the present process are:

11-aminodibenz[b,f][1,4]oxazepine,
11-dimethylaminodibenz[b,f][1,4]oxazepine,
11-ethylaminodibenz[b,f][1,4]oxazepine,
2-chloro-11-dimethylaminodibenz[b,f][1,4]oxazepine,
11-aminodibenz[b,f][1,4]thiazepine,
11-ethylaminodibenz[b,f][1,4]thinazepine,
2 - methyl-11-dimethylaminodibenz[b,f][1,4]oxazepine,
11 - dimethylamino - 8 - methoxydibenz[b,f][1,4]oxazepine,
2 - chloro-11-dimethylaminodibenz[b,f][1,4]thiazepine,
2-bromo-11-methylaminodibenz[b,f][1,4]thiazepine,
11-amino - 2 - trifluoromethyldibenz[b,f][1,4]oxazepine,
2-chloro - 11 - methylamino-8-trifluoromethyldibenz[b,f][1,4]oxazepine, and the like.

Reacting the above dibenz[b,f][1,4]oxazepines and thiazepins with amines of the following type produces compounds of the present invention;

N,N'-dimethylethylenediamine;
ethanolamine;
ethylenediamine;
N-methylethylenediamine;
2-ethoxyethylamine;
N,N,N'-trimethylethylenediamine;
N,N-dimethylpropylenediamine;
1-(2-aminoethyl)-4-methylpiperazine;
1-(2-aminoethyl)pyrrolidine;
1-(2-aminoethyl)-4-methylpiperidine;
4-(3-aminopropyl)morpholine;
piperazine;
N-methylpiperazine;
N-ethyl-piperazine;
N-(2-hydroxyethyl)piperazine; and the like.

The following examples describe in detail the preparation of representative substituted 11-aminodibenz[b,f][1,4]oxazepines and thiazepines of the present invention.

EXAMPLE 1

Preparation of 11-[methyl(2-methylaminoethyl)amino]dibenz[b,f][1,4]oxazepine dihydrochloride A mixture of 3 g. of 11-aminodibenz[b,f][1,4]oxazepine, 1 g. of ammonium chloride and 10 ml. of N,N'-dimethylethylenediamine is heated on the steam bath for about 48 hours. The mixture is then heated under reduced pressure, and the excess diamine is removed by distillation. The resulting residue containing the crude product, is dissolved in 100 ml. of cold 10% hydrochloric acid, and the acidic solution is extracted with ether to remove impurities. Neutralization of the aqueous layer by the addition of cold 10% sodium hydroxide precipitates the crude product, and the mixture is extracted with ether, the ether extracts are dried over sodium hydroxide pellets and concentrated. The resulting oil is purified by partition chromatography on diatomaceous silica, recovered as an oil, dissolved in ether, dried over potassium hydroxide pellets, filtered and treated with anhydrous hydrogen chloride. 11 - [methyl(2 - methylaminoethyl)amino]dibenz[b,f][1,4]oxazepine dihydrochloric (1.4 g.), melting point 220°–225° C. dec., is obtained.

EXAMPLE 2

Preparation of 11-(2-hydroxyethylamino)dibenz[b,f][1,4]oxazepine

A mixture of 2 g. of 11-aminodibenz[b,f][1,4]oxazepine, 1 g. of ammonium chloride and 10 ml. of ethanolamine is heated on the steam bath for about 48 hours. The mixture is then heated under reduced pressure and the excess ethanolamine is removed by distillation. The resulting residue, containing the crude product, is dissolved in 40 ml. of ethanol, and the solution is stirred with potassium carbonate, filtered and concentrated. The crude product is obtained as an oily residue which crystallizes (melting point 125°–130° C.). Purification by recrystallization from ethyl acetate gives 11-(2-hydroxyethylamino)dibenz[b,f][1,4]oxazepine (1.25 g.), melting point 136°–139° C.

EXAMPLE 3

Preparation of 11-(4-methyl-1-piperazinyl)dibenz[b.f][1,4]oxazepine

A mixture of 5 g. of 11-dimethylaminodibenz[b,f][1,4]oxazepine, 1.2 g. of ammonium chloride and 25 ml. of 1-methylpiperazine is heated in an autoclave at 175° C. for 24 hours. Methanol (100 ml.) is added to the reaction mixture and the resulting solution is evaporated to an oily residue which contains the crude product. This mixture is taken up in 100 ml. of water, acidified with cold, dilute hydrochloric acid (1 N) and filtered to remove precipitated solid. Concentrated ammonium hydroxide solution is added to the acidic filtrate until the mixture remains alkaline, the aqueous suspension is extracted with ether, and the ether extracts are dried over potassium hydroxide pellets and evaporated. The resulting oily residue is purified by repeating the above procedure, dissolving the product in aqueous hydrochloric acid, filtering and reprecipitating with ammonium hydroxide. The product is thereby obtained as a semi-solid residue (1.9 g.) after evaporation of the dried ether extracts, and when further purified by chromatography on silica gel followed by crystallization from petroleum ether, 11-(4-methyl-1-piperazinyl)dibenz[b,f][1,4]oxazepine, melting point 97°–98° C., is obtained.

EXAMPLE 4

Preparation of 2-chloro-11-(4-methyl-1-piperazinyl)dibenz[b,f][1,4]oxazepine

The general procedure of Example 3 is repeated. A mixture of 2-chloro-11-dimethylaminodibenz[b,f][1,4]oxazepine hydrochloride and an excess of 1-methylpiperazine is heated in an autoclave at 175° C. for about 24 hours and the crude product is isolated. When purified and crystallized from petroleum ether, 2-chloro-11-(4-methyl-1-piperazinyl)dibenz[b,f][1,4]oxazepine, melting point 108°–110° C. is obtained

EXAMPLE 5

Preparation of 11-aminodibenz[b,f][1,4]oxazepine

To a suspension of 2.8 g. of phosphorus pentachloride in 15 ml. of acetyl chloride cooled in ice and protected from moisture is added cautously 2.1 g. of xanthone oxime. The mixture is stirred, allowed to warm to room temperature overnight. Concentration of the solution yields 11-chlorodibenz[b,f][1,4]oxazepine as a solid which is too unstable to isolate and purify. Traces of phosphorus oxychloride and acetyl chloride are removed, by adding benzene (about 40 ml.) and redistilling under reduced pressure.

The freshly prepared 11-chlorodibenz[b,f][1,4]oxazepine is dissolved in 20 ml. of benzene and added to 70 ml. of ethanol previously saturated with ammonia at 0° C. The mixture is kept at 0–5° C. for 3 days and then concentrated. The residue is dissolved in 20 ml. of cold 10% hydrochloric acid, and the insoluble hydrochloride is collected (2.1 g.). When recrystallized from ethanol and isopropanol, the hydrochloride melts at 239°–241° C.

11-aminodibenz[b,f][1,4]oxazepine base, melting point 198–200° C., is obtained by treatment of a mixture of the hydrochloride and aqueous acid with 10% sodium hydroxide solution followed by extraction into benzene and evaporation of the dried extracts.

EXAMPLE 6

Preparation of 11-dimethylaminodibenz[b,f][1,4]oxazepine

A mixture of 75 g. of o-phenoxyaniline, 50 g. of dimethylcarbamyl chloride and 75 g. of dimethylaniline in 150 ml. of anhydrous benzene is allowed to react at room temperature for about 20 hours, and then heated on the steam bath for about 3 hours. The cooled reaction mixture is acidified with 10 ml. of concentrated hydrochloric acid and 200 ml. of water is added. The benzene layer is separated, dried over sodium sulfate, and 300 ml. of petroleum ether is added. After cooling to about 0° C., the product is collected, and 1,1-dimethyl-3-(o-phenoxyphenyl)urea, melting point 120°–121° C. (55 g.), is thereby obtained.

A mixture of 26 g. of 1,1-dimethyl-3-(o-phenoxyphenyl)urea, 25 g. of phosphorus pentoxide and 30 ml. of phosphorus oxychloride is heated under reflux for about 6 hours and allowed to cool overnight. The mixture is concentrated by evaporation under reduced pressure (while heating at 60°–80° C. Chloroform (200 ml.) and 200 g. of ice are then added to the gummy residue, and the mixture is made alkaline with aqueous sodium hydroxide (3 N). The chloroform layer is separated, dried over sodium sulfate and evaporated. This residue is dissolved in 400 ml. of ether, and treated with an excess of anhydrous hydrogen chloride. The precipitated product (as its HCl salt) is collected, dissolved in 300 ml. of water, and concentrated aqueous ammonium hydroxide is added until the mixture remains alkaline. The resulting suspension is extracted with ether, and the ether layer is separated, dried over potassium hydroxide, and evaporated to a solid residue. This residue is then dissolved in chloroform (100 ml.) and extracted with dilute hydrochloric acid (100 ml.). The aqueous acidic layer is separated, treated, with aqueous sodium hydroxide (3 N) until the mixture remains alkaline, and the mixture is extracted with ether. Separation of the ether layer, drying over potassium hydroxide, and evaporation of the solvent then yields the desired product, 2-dimethylaminodibenz[b,f][1,4]oxazepine, as a white solid, melting point 111°–113° C.

EXAMPLE 7

Preparation of 2-chloro-11-dimethylaminodibenz[b,f][1,4]oxazepine

The procedure of Example 6 is repeated. By reacting o-(p - chlorophenoxy)aniline with dimethylcarbamyl chloride, 1,1-dimethyl - 3-[o-(p-chlorophenoxy)phenyl] urea is obtained and then cyclized to produce the product, 2-chloro - 11-dimethylaminodibenz[b,f][1,4]oxazepine.

EXAMPLE 8

Preparation of 2-chloro-11-(4-methyl-1-piperazinyl)-dibenz[b,f][1,4]thiazepine

The procedure of Example 1 is repeated. By heating 2-chloro-11-aminodibenz[b,f][1,4]thiazepine with an excess of N-methylpiperazine, the product 2-chloro-11-(4-methyl-1 - piperazinyl)dibenz[b,f][1,4]thiazepine is obtained.

EXAMPLE 9

Preparation of 11-(4-methyl-1-piperazinyl)dibenz[b,f][1,4]-thiazepine

The procedure of Example 3 is repeated. By heating 11-aminodibenz[b,f][1,4]thiazepine with an excess of N-methylpiperazine and 11-(4-methyl-1-piperazinyl)dibenz[b,f][1,4]thiazepine is obtained.

EXAMPLE 10

Preparation of 2-chloro-11-(1-piperazinyl)-dibenz[b,f][1,4]-thiazepine

When the procedure of Example 1 is repeated and 2-chloro - 11-aminodibenz[b,f][1,4]thiazepine is heated with an excess of piperazine, the product 2-chloro-11-(1-piperazinyl)-dibenz[b,f][1,4]thiazepine is obtained.

EXAMPLE 11

Preparation of 2-chloro-11-[4-(2-hydroxyethyl)-1-piperazinyl]-dibenz[b,f][1,4]thiazepine Using the procedure of Example 1 and heating 2-chloro-11-aminodibenz[b,f][1,4]thiazepine with an excess of N-(2-hydroxyethyl)piperazine, the product 2-chloro - 11-[4-(2-hydroxyethyl)-1 - piperazinyl]-dibenz[b,f][1,4]thiazepine is obtained.

EXAMPLE 12

Preparation of 2-methyl-11-(4-methyl-1-piperazinyl)-dibenz[b,f][1,4]thiazepine

When the procedure of Example 1 is repeated and 11-amino-2-methyldibenz[b,f][1,4]thiazepine is heated with an excess of N-methylpiperazine the product 2-methyl - 11-(4-methyl - 1-piperazinyl)dibenz[b,f][1,4]thiazepine is obtained.

EXAMPLE 13

Preparation of 2-bromo-11-(4-methyl-1-piperazinyl)-dibenz[b,f][1,4]oxazepine

Repeating the procedure of Example 3 and heating 2-bromo-11 - ethylaminodibenz[b,f][1,4]oxazepine with an excess of N-methylpiperazine the product 2-bromo-11-(4 - methyl-1-piperazinyl)-dibenz[b,f][1,4]oxazepine is obtained.

EXAMPLE 14

Preparation of 2-fluoro-11-(4-methyl-1-piperazinyl)-dibenz[b,f][1,4]oxazepine

When the procedure of Example 1 is repeated and 11-amino - 2-fluorodibenz[b,f][1,4]oxazepine is heated with an excess of N-methylpiperazine, the product 2- fluoro - 11-(4-methyl-1-piperazinyl)dibenz[b,f][1,4] oxazepine is obtained.

EXAMPLE 15

Preparation of 8-chloro-11-(4-methyl-1-piperazinyl)-dibenz[b,f][1,4]oxazepine

The procedure of Example 1 is repeated. By heating 2-amino-8-chlorodibenz[b,f][1,4]oxazepine with an excess of N-methylpiperazine, the product 8-chloro-11-(4-methyl-1-piperazinyl)dibenz[b,f][1,4] oxazepine is obtained.

EXAMPLE 16

Preparation of 11-(4-methyl-1-piperazinyl)-2-trifluoromethyl-dibenz[b,f][1,4]oxazepine When the procedure of Example 1 is repeated and 11 - amino-2-trifluoromethyl - dibenz[b,f][1,4]oxazepine is heated with an excess of N-methylpiperazine, the product 11-(4-methyl-1-piperazinyl)-2 - trifluoromethyl - dibenz[b,f][1,4]oxazepine is obtained.

EXAMPLE 17

Preparation of 11-(4-methyl-1-piperazinyl)-8-trifluoromethyl-dibenz[b,f][1,4]thiazepine Using the procedure of Example 1 and heating 11-amino-8-trifluoromethyl-dibenz[b,f][1,4]thiazepine with an excess of N-methylpiperazine, the desired product, 11-(4-methyl - 1 - piperazinyl)-8-trifluoromethyl-dibenz[b,f][1,4]thiazepine is obtained.

EXAMPLE 18

Preparation of 2-methoxy-11-(4-methyl-1-piperazinyl)-dibenz[b,f][1,4]oxazepine

The procedure of Example 1 is repeated, except that 11-amino-2-methoxydibenz[b,f][1,4]oxazepine is heated with an excess of N-methylpiperazine to produce 2-methoxy-11-(4-methyl-1 - piperazinyl)-dibenz[b,f][1,4] oxazepine.

EXAMPLE 19

Preparation of 2,8-dichloro-11-(4-methyl-1-piperazinyl)-dibenz[b,f][1,4]oxazepine Using the procedure of Example 1 and heating 11-amino-2,8 - dichlorodibenz[b,f][1,4]oxazepine with an excess of N-methylpiperazine, the product 2,8-dichloro-11-(4-methyl-1-piperazinyl)dibenz[b,f][1,4]oxazepine is obtained.

EXAMPLE 20

Preparation of 11-(2-dimethylaminoethylamino)-dibenz[b,f][1,4]oxazepine

The procedure of Example 1 is repeated and upon heating 11-aminodibenz[b,f][1,4]oxazepine with an excess of N,N-dimethylethylenediamine, the desired product, 11-(2 - dimethylaminoethylamino)dibenz[b,f][1,4] oxazepine is obtained.

EXAMPLE 21

Preparation of 11-(3-dimethylaminopropylamino)-dibenz[b,f][1,4]oxazepine

The procedure of Example 1 is repeated and 11-aminodibenz[b,f][1,4]oxazepine is heated with an excess of N,N-dimethyl-1,3-propanediamine, to produce 11-(3-dimethylaminopropylamino)dibenz[b,f][1,4]oxazepines.

EXAMPLE 22

Preparation of 11-(3-dimethylamino-2-methylpropylamino)dibenz[b,f][1,4]oxazepine When the procedure of Example 1 is repeated and 11-aminodibenz[b,f][1,4]oxazepine is heated with an excess of N,N-dimethyl-2-methyl-1,3-propanediamine, the product 11 - (3 - dimethylamino-2-methylpropylamino)dibenz[b,f][1,4]oxazepine is obtained.

EXAMPLE 23

Preparation of 11-(2-aminoethylamino)dibenz[b,f][1,4]oxazepine

Using the procedure of Example 1 and heating 11-aminodibenz[b,f][1,4]oxazepine with an excess of ethylenediamine, the product 11-(2-aminoethylamino)dibenz[b,f][1,4]oxazepine is obtained.

EXAMPLE 24

Preparation of 11-(2-diethylaminoethylamino)-4-methyldibenz[b,f][1,4]oxazepine

Using the procedure of Example 1 and heating 11-amino-4-methyldibenz[b,f][1,4]oxazepine with an excess of N,N-diethylethylenediamine, produces 11-(2-diethylaminoethylamino)-4-methyldibenz[b,f][1,4]oxazepine.

EXAMPLE 25

Preparation of 11-(1-piperazinyl)dibenz-[b,f][1,4]oxazepine

When the procedure of Example 1 is used and 11-aminodibenz[b,f][1,4]oxazepine is heated with an excess of piperazine, the product 11-(1-piperazinyl)dibenz[b,f][1,4]oxazepine is obtained.

EXAMPLE 26

Preparation of 2-chloro-11-(1-piperazinyl)dibenz-[b,f][1,4]oxazepine

The general procedure of Example 1 is repeated. By heating 11-amino-2-chlorodibenz[b,f][1,4]oxazepine with an excess of piperazine, the product 2-chloro-11-(1-piperazinyl)dibenz[b,f][1,4]oxazepine is obtained.

EXAMPLE 27

Preparation of 11-(2-methoxyethylamino)dibenz-[b,f][1,4]oxazepine

Using the procedure of Example 1 and heating 11-aminodibenz[b,f][1,4]oxazepine with an excess of 2-methoxyethylamine, the product 11-(2-methoxyethylamino)dibenz[b,f][1,4]oxazepine is obtained.

EXAMPLE 28

Preparation of 2-chloro-11-[2-(4-methyl-1-piperazinyl)-ethylamino]dibenz[b,f][1,4]oxazepine The general procedure of Example 1 is repeated. By heating 11-amino-2-chlorodibenz[b,f][1,4]oxazepine with an excess of 1-(2-aminoethyl)-4-methylpiperazine, 2-chloro - 11 - [2 - (4 - methyl-1-piperazinyl)ethylamino]dibenz[b,f][1,4]oxazepine is obtained.

EXAMPLE 29

Preparation of 11-[2-(1-pyrrolidinyl)ethylamino]-dibenz[b,f][1,4]oxazepine

When the procedure of Example 1 is used and 11-aminodibenz[b,f][1,4]oxazepine is heated with an excess of N-(2-aminoethyl)pyrrolidine, the product 11-[2-(1-pyrrolidinyl)ethylamino]dibenz[b,f][1,4]oxazepine is obtained.

EXAMPLE 30

Preparation of 11-(2-piperidinoethylamino)dibenz-[b,f][1,4]oxazepine

The general procedure of Example 1 is repeated. By heating 11-aminodibenz[b,f][1,4]oxazepine with an excess of N-(2-aminoethyl)piperidine, the product 11-(2-piperidinoethylamino)dibenz[b,f][1,4]oxazepine is obtained.

EXAMPLE 31

Preparation of 11-(2-morpholinoethylamino)dibenz-[b,f][1,4]oxazepine

When the procedure of Example 1 is used and 11-aminodibenz[b,f][1,4]oxazepine is heated with an excess of 4-(2-aminoethyl)morpholine, the product 11-(2-morpholinoethylamino)dibenz[b,f][1,4]oxazepine is obtained.

We claim:

1. A method of preparing compounds of the formula:

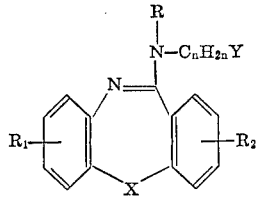

wherein R is selected from the group consisting of hydrogen and lower alkyl, $R_1$ and $R_2$ are selected from the group consisting of hydrogen, lower alkyl, lower alkoxy, halogen and trifluoromethyl, X is selected from the group consisting of oxygen and sulfur, Y is selected from the group consisting of hydroxy, amino, lower alkylamino, lower dialkylamino, lower alkoxy, 1-piperazino, 4-(lower alkyl)-1-piperazino, 4-(hydroxyloweralkyl)-1-piperazino, pyrrolidino, lower alkylpyrrolidino, piperidino, lower alkylpiperidino, morpholino and lower alkylmorpholino and the

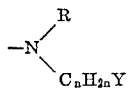

group taken together is a piperazino selected from the group consisting of 1-piperazino, 4-(loweralkyl)-1-piperazino and 4-(hydroxyloweralkyl)-1-piperazino and $n$ is an integer from 2 to 4 which comprises heating an azepine of the formula:

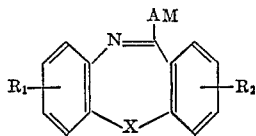

wherein $R_1$, $R_2$ and X are as defined above, and AM is selected from the group consisting of amino, lower alkylamino and dilower alkylamino with an excess of an amine of the formula:

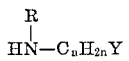

wherein R, $n$ and Y are as defined above in the presence of an acidic catalyst at a temperature within the range of from about 80° C. to 220° C. for a period of from about 2 hours to 48 hours and recovering said compounds therefrom.

2. A method in accordance with claim 1 for the preparation of 2-chloro-11-(4-methyl-1-piperazinyl)dibenz[b,f][1,4]oxazepine wherein the azepine is 2-chloro-11-dimethylaminodibenz[b,f][1,4]oxazepine and the amine is N-methylpiperazine.

3. A method in accordance with claim 1 for the preparation of 11 - (4 - methyl - 1-piperazinyl)dibenz[b,f][1,4]oxazepine and the amine is N-methylpiperazine.

4. A method in accordance with claim 1 for the preparation of 11 - (2 - hydroxyethylamino)dibenz[b,f][1,4]oxazepine wherein the azepine is 11-aminodibenz[b,f][1,4]oxazepine and the amine is ethanolamine.

5. A method in accordance with claim 1 for the preparation of 2-chloro-11-(4-methyl-1-piperazinyl)dibenz[b,f][1,4]thiazepine wherein the azepine is 2-chloro-11-aminodibenz[b,f][1,4]thiazepine and the amine is N-methylpiperazine.

6. A method in accordance with claim 1 for the preparation of 11-(4-methyl-1-piperazinyl)dibenz[b,f][1,4]thiazepine wherein the azepine is 11-aminodibenz[b,f][1,4]thiazepine and the amine is N-methylpiperazine.

7. A method in accordance with claim 1 for the preparation of 2-fluoro-11-(4-methyl-1-piperazinyl)dibenz[b,f][1,4]oxazepine wherein the azepine is 2-fluoro-11-aminodibenz[b,f][1,4]oxazepine and the amine is N-methylpiperazine.

References Cited

UNITED STATES PATENTS 3,133,086    5/1964    Bossard et al. _____ 260—268 X

ALEX MAZEL, *Primary Examiner.*

D. G. DAUS, *Assistant Examiner.*

U.S. Cl. X.R.

260—247.1, 247.5, 293, 326.8, 327, 333, 584, 999